US009747881B2

(12) United States Patent
Zamir

(10) Patent No.: US 9,747,881 B2
(45) Date of Patent: Aug. 29, 2017

(54) BEAT DETECTION AND ENHANCEMENT

(71) Applicant: BOSE CORPORATION, Framingham, MA (US)

(72) Inventor: Lee Zamir, Framingham, MA (US)

(73) Assignee: BOSE CORPORATION, Framingham, MA (US)

( * ) Notice: Subject to any disclaimer, the term of this patent is extended or adjusted under 35 U.S.C. 154(b) by 36 days.

(21) Appl. No.: 14/675,631

(22) Filed: Mar. 31, 2015

(65) Prior Publication Data

US 2016/0293150 A1 Oct. 6, 2016

(51) Int. Cl.

*G06F 17/00* (2006.01)
*G10H 1/42* (2006.01)
*G10H 1/32* (2006.01)

(52) U.S. Cl.

CPC ................ *G10H 1/42* (2013.01); *G10H 1/32* (2013.01); *G10H 2210/076* (2013.01)

(58) Field of Classification Search

CPC .. G10H 1/0008; G10H 1/12; G10H 2210/066; G10H 2210/076; G10H 2210/081; G10H 1/32; G10H 1/42; G10H 2210/0081

USPC ........... 700/94–95; 381/56–63, 70, 111, 151, 381/160, 339, 345–354, 423

See application file for complete search history.

(56) References Cited

U.S. PATENT DOCUMENTS

| | | | | |
|---|---|---|---|---|
| 2,811,809 A * | 11/1957 | Di Franco | A63H 13/12 | 446/3 |
| 3,672,092 A * | 6/1972 | Tepper | A63H 13/12 | 446/359 |
| 4,027,425 A * | 6/1977 | Morrison | A63H 11/00 | 446/299 |
| 4,297,806 A * | 11/1981 | Ilkcagla | A63H 3/28 | 446/303 |
| 5,270,480 A * | 12/1993 | Hikawa | A63H 13/00 | 446/298 |
| 6,027,463 A * | 2/2000 | Moriyasu | A61H 23/0236 | 601/46 |
| 7,534,951 B2 * | 5/2009 | Yamashita | G10H 1/368 | 84/600 |
| 8,000,825 B2 * | 8/2011 | Ullrich | G06F 3/016 | 340/407.1 |
| 8,952,233 B1 * | 2/2015 | Johnson | G10H 1/40 | 84/652 |
| 2012/0271638 A1 * | 10/2012 | Regler | G09B 5/04 | 704/272 |

* cited by examiner

*Primary Examiner* — Hemant Patel

(74) *Attorney, Agent, or Firm* — Patterson + Sheridan, LLP

(57) ABSTRACT

A system encourages experimentation with audio frequency and speaker technologies while causing an inanimate figure to appear to dance. The system applies a bandpass filter to an incoming audio stream (e.g., in a low frequency bass band). The system monitors the magnitude of the audio content in a frequency band of interest. When an amplitude peak or other threshold magnitude is detected, a controller injects a short pulse (e.g., 3 cycles) of a sub-audible low frequency sine wave to a platform. Preferably, the sub-audible low frequency sine wave is at a resonance frequency of the platform to maximize its movement. The figure is positioned on the platform and appears to dance to the beat of the music.

20 Claims, 6 Drawing Sheets

BEAT DETECTION AND ENHANCEMENT

I. FIELD OF THE DISCLOSURE

The present disclosure relates generally to sound production assemblies, and more particularly, audio demonstration and experimentation kits, including components thereof.

II. BACKGROUND

With the increase in prevalence of mobile computing devices, children are being introduced to computing technology at a younger age. For example, it is common for a child to be proficient in operating a mobile phone or a tablet computer. It is desirable to encourage children's interest and familiarity with aspects of audio, video, and communications technologies.

III. SUMMARY

In one implementation, a system includes a receiver to receive an audio signal and a controller to detect a magnitude of the audio signal. In response to the detection, the controller generates a sub-audible signal that is substantially coincident with the detected magnitude.

In another example, a system includes a platform to move in a reciprocal manner in response to vibrations associated with an audio signal. A controller detects a magnitude of the audio signal, and in response, generates an enhancing signal. The enhancing signal is substantially coincident with the detected magnitude and affects the movement of the platform.

In another example, a system includes a platform to move in a reciprocal manner in response to vibrations associated with an audio signal. A controller detects a plurality of magnitudes in the audio signal and generates enhancing signals to increase the vibrations according to the detected magnitudes.

Other features, objects, and advantages will become apparent from the following detailed description and drawings.

IV. BRIEF DESCRIPTION OF THE DRAWINGS

V. DETAILED DESCRIPTION

A system encourages experimentation with audio frequency and speaker technologies while causing an inanimate figure to appear to dance. The system applies a bandpass filter to an incoming audio stream. In one example, the bandpass filter passes low bass band frequency audio. The system monitors the magnitude of the audio content in a frequency band of interest. When an amplitude peak or other threshold magnitude is detected, a controller injects a short pulse (e.g., 3 cycles) of a sub-audible low frequency sine wave to a platform. Preferably, the sub-audible low frequency sine wave is at a resonance frequency of the platform to maximize its movement. The figure is positioned on the platform and appears to dance to the beat of the music.

In an example, the sub-audible low frequency sine wave is at a resonance frequency of the platform to maximize its movement. To a naked ear, the tone (sub-audible) is absent. However, the eye of the observer sees the maximum effect by exciting the resonance of the system. The audio system of an implementation has its resonance tuned to a frequency that is sub-audible.

Figure 1:
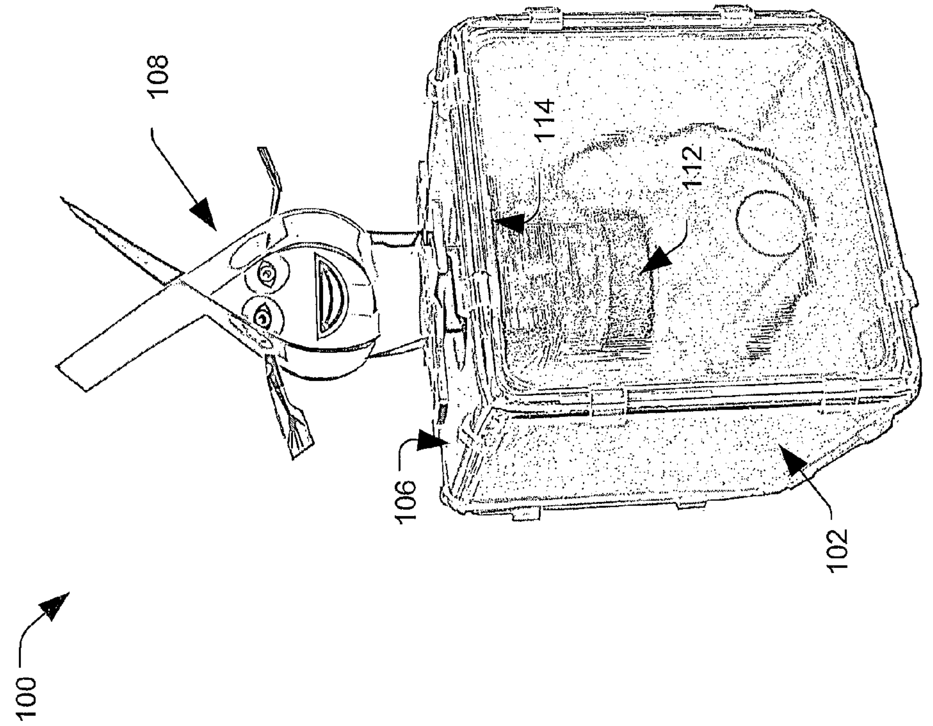
FIG. 1 illustrates a perspective view of an audio demonstration system that includes an audio production system and a figure configured to bounce according to vibrations of the audio production system.

FIG. 1 illustrates a perspective view of an audio demonstration system 100 that includes an audio production system 102 and a FIG. 108. A platform surface 106 of the audio system 100 reciprocates to create an illusion that the FIG. 108 is dancing to a beat of the music. In one implementation, the beat of music played by the system 102 is augmented with a sub-audible resonant signal to bolster the vibrations otherwise attributable to audio signal. In this manner, the vibrations coincident with the beat are multiplied and the dancing movements of the FIG. 108 are exaggerated. Because the resonant signal is sub-audible (e.g., 20 Hz or lower), the enhancing, sub-audible signal does not interfere with the listening experience of an observer.

The audio production system 102 includes a magnet speaker assembly 112 that causes a diaphragm 114 to vibrate according to a received audio signal. The audio signal is bandpass filtered to allow only those frequencies of the audio signal that are associated with a bass frequency, or other portion that tracks a beat of music (i.e., the voice band, around 20 Hz to around 300 Hz). The diaphragm 114 physically communicates those vibrations to the FIG. 108. The FIG. 108 is flexible and moves in response to the reciprocating movement of the diaphragm 114 of the platform surface 106. In certain implementation, a strobe light (not shown) flashes according to the motion of the platform surface 106 to visually capture a succession of movements of the FIG. 108.

Because the sub-audible resonant pulses bolster vibrations coincident with the musical beat, the FIG. 108 appears to be dancing in time with the music. Moreover, the magnitude of the vibrations is compounded, exaggerating the perceived dancing movements of the FIG. 108.

Figure 2:
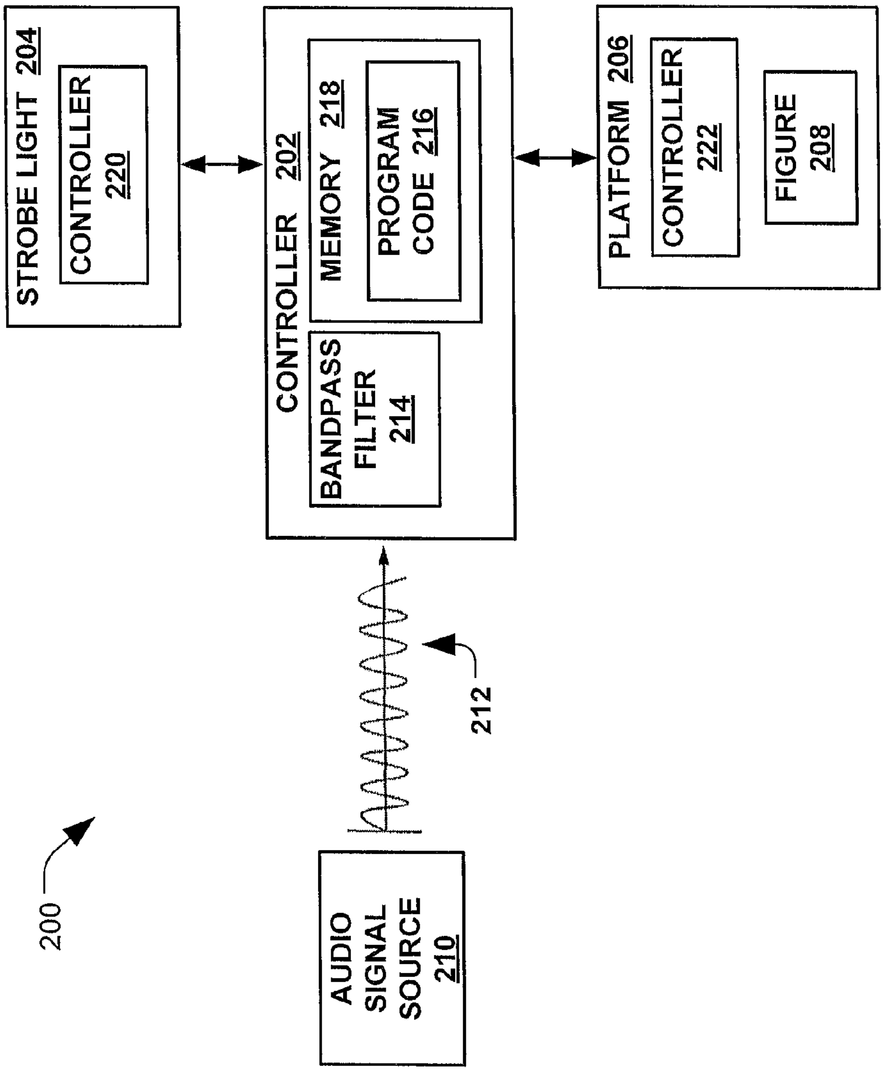
FIG. 2 is a block diagram of an audio system that includes a controller in communication with a reciprocating platform.

FIG. 2 is a block diagram of an audio system 200 that includes a controller 202 in communication with a reciprocating platform 206. The controller 202 augments a detected musical beat with non-audible sinusoidal signals. The enhanced signals dramatically move the platform 206 to cause a FIG. 208 positioned on the platform 206 to move to the beat.

An audio signal source 210 provides an audio signal to a receiver of the controller 202. An illustrative audio signal source 210 includes an MP3 player, a radio, a telephone, a computer, and a satellite feed, among others. The connection to the controller 202 may be wired or wireless. A full spectrum audio signal 212 is downloaded or otherwise received by the controller 202. A bandpass filter 214 is used to reject frequencies of the received audio signal that fall outside of a desired band (i.e., lower than around 20 Hz and higher than around 300 Hz).

The controller 202 executes program code 216 stored in a memory 218 to designate and monitor for magnitudes in the filtered audio signal. The magnitudes of an example include peaks in the audio signal. The peaks correspond to percussion or other instrumentation generating the musical beat. When a peak is detected, the controller 202 executes the program code 216 to generate enhancing signals comprising bursts that resonate and actuate the platform 206 at time that is coincident with the detected peak. In this manner, the platform 206 is made to move in synchronization with the musical beat.

The controller 202 shown in FIG. 2 communicates the audio signal and enhancing signal to the platform 206. A platform in another example alternatively or additionally receives the audio signal directly from an audio source.

The platform 206 includes a substantially planar surface so that the FIG. 208 rests upon it. The platform 206 of another example has a non-planar surface to which the FIG. 208 is removably or permanently attached. The FIG. 208 includes pliable or flexible material, such as paper, coiled metal or plastic, and rubber.

The frequency at which the platform 206 reciprocates is known to the controller 202. For example, the platform 206 may be actuated by the frequencies inherent to the audio signal. Such actuation occurs where the platform 206 is in contact with or comprises part of a speaker assembly. A strobe light 204 is optionally controlled to pop, or briefly illuminate, the FIG. 208.

While a centralized controller 202 is shown in the block diagram of FIG. 2, one skilled in the art will appreciate that the functions of the controller 202 could be divided and augmented by controllers 220, 222 distributed throughout the system 200. Further, the controller 202 could be integrated in a device with one or all of the other components 204, 206, 210 of the system 200.

Figure 3:
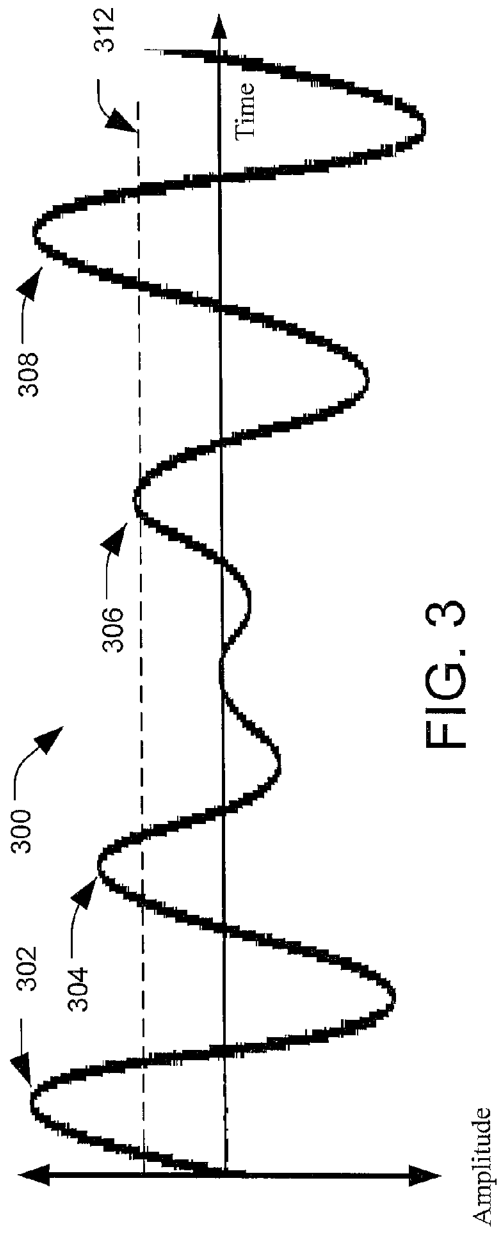
FIG. 3 shows an audio signal, such as is used by the controller of FIG. 2 to determine peak amplitudes.
Figure 4:
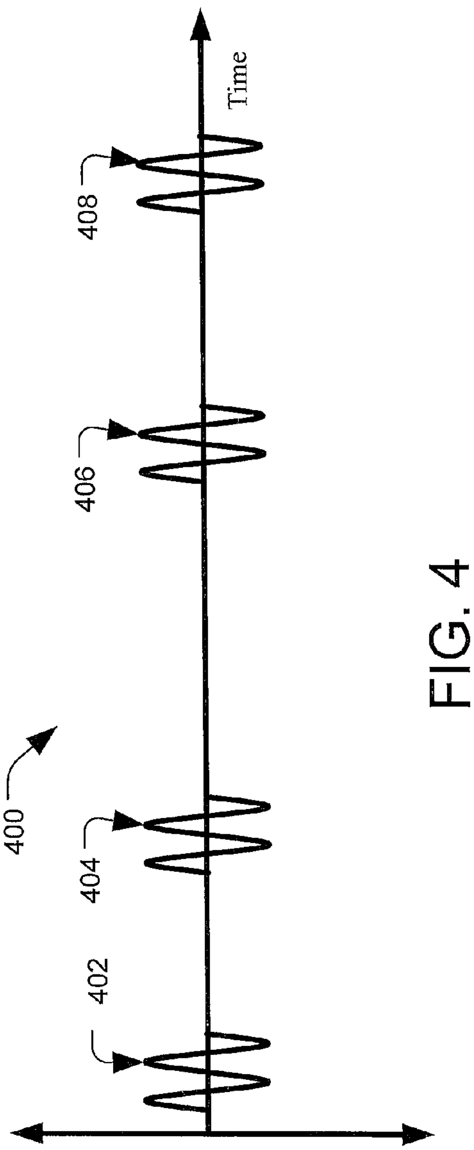
FIG. 4 shows enhancing signals generated according to the determined peak amplitudes of the signal of FIG. 3.

FIG. 3 illustrates an audio signal 300, such as is used by the controller 202 of FIG. 2 to determine peaks 302, 304, 306, 308. The peaks 302, 304, 306, 308, in turn, are used as queues to initiate generation of enhancing signals (as shown in FIG. 4). The audio signal 300 in FIG. 3 has been filtered to include audible base frequencies. The peaks 302, 304, 306, 308 detected correspond likely correspond to a musical beat of the audio signal.

In one implementation, the peaks 302, 304, 306, 308 are determined whenever an audio curve crosses a predetermined magnitude level, as denoted by the dashed, parallel line 312. In an example, magnitudes are predetermined. In another implementation, the controller uses comparative or fuzzy logic to determine the peaks based on relative change in amplitude relative to a previous signal measurement.

FIG. 4 shows enhancing signals 402, 404, 406, 408 generated according to the determined peak amplitudes 302, 304, 306, 308 of the signal of FIG. 3. The enhancing signals 402, 404, 406, 408 are coincident with the peak amplitudes 302, 304, 306, 308 (and musical beat) so as to artificially enhance the perceived beat. For example, the enhancing signals 402, 404, 406, 408 comprise in-audible sine waves that cause a shaker table or other platform to vibrate. A figure positioned on the platform is actuated in response to the enhancing signals 402, 404, 406, 408, giving the impression that it is dancing in time with the musical beat.

Figure 5:
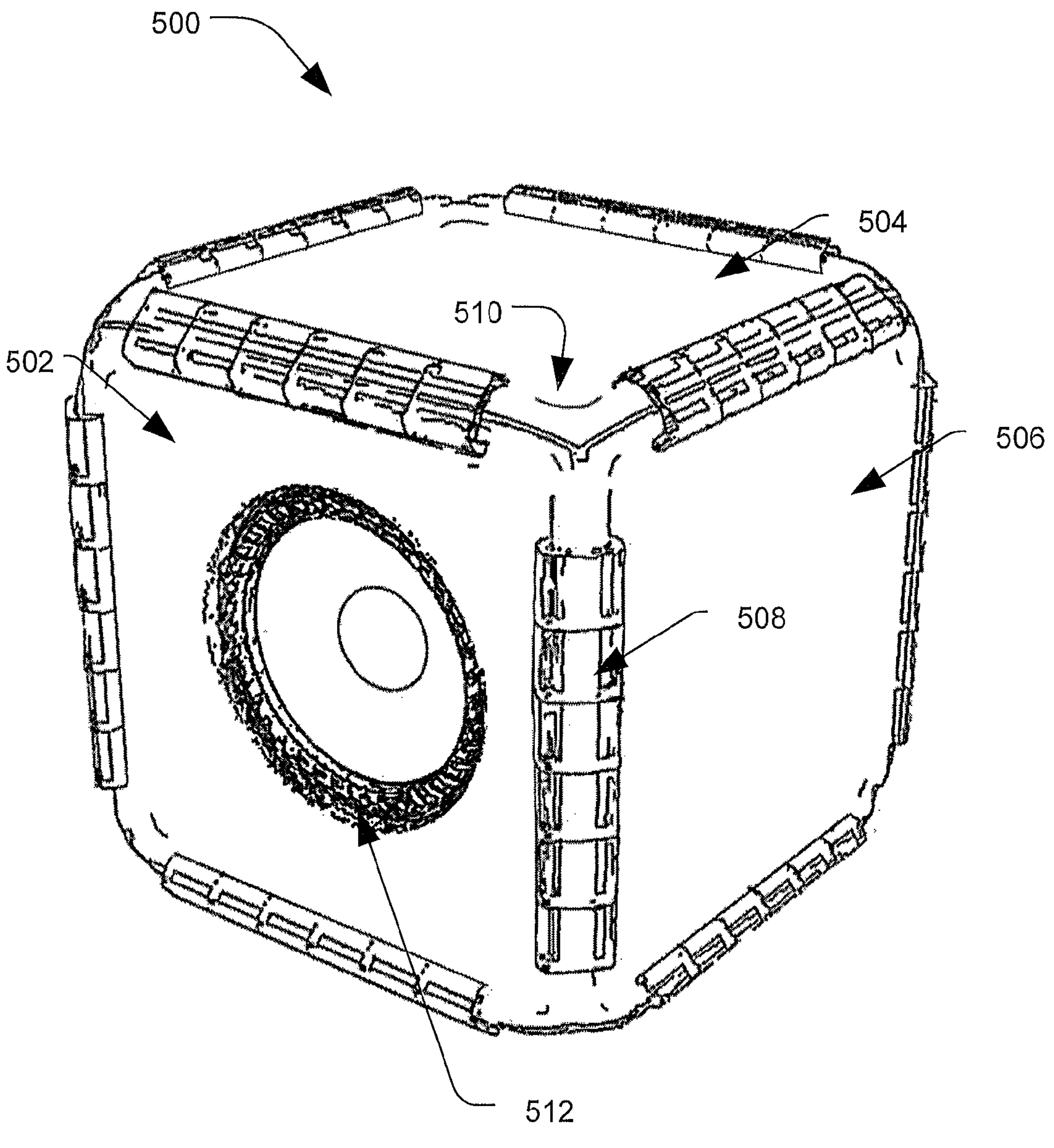
FIG. 5 shows a perspective view a cube audio system, such as is illustrated in FIG. 1.

FIG. 5 shows a perspective view a cube audio system 500, such as is shown in FIG. 1. The system 500 is assembled by a user by fitting panels 502, 504, 506 together using clips 508. Assembly of the panel 502, 504, 506 and clips 508 is facilitated by interior and exterior grooves 510. Panel 502 includes a diaphragm 512. As such, the panel 502 comprises a reciprocating platform that moves linearly in response to changing magnetic fields surrounding an internal voice coil.

Figure 6:
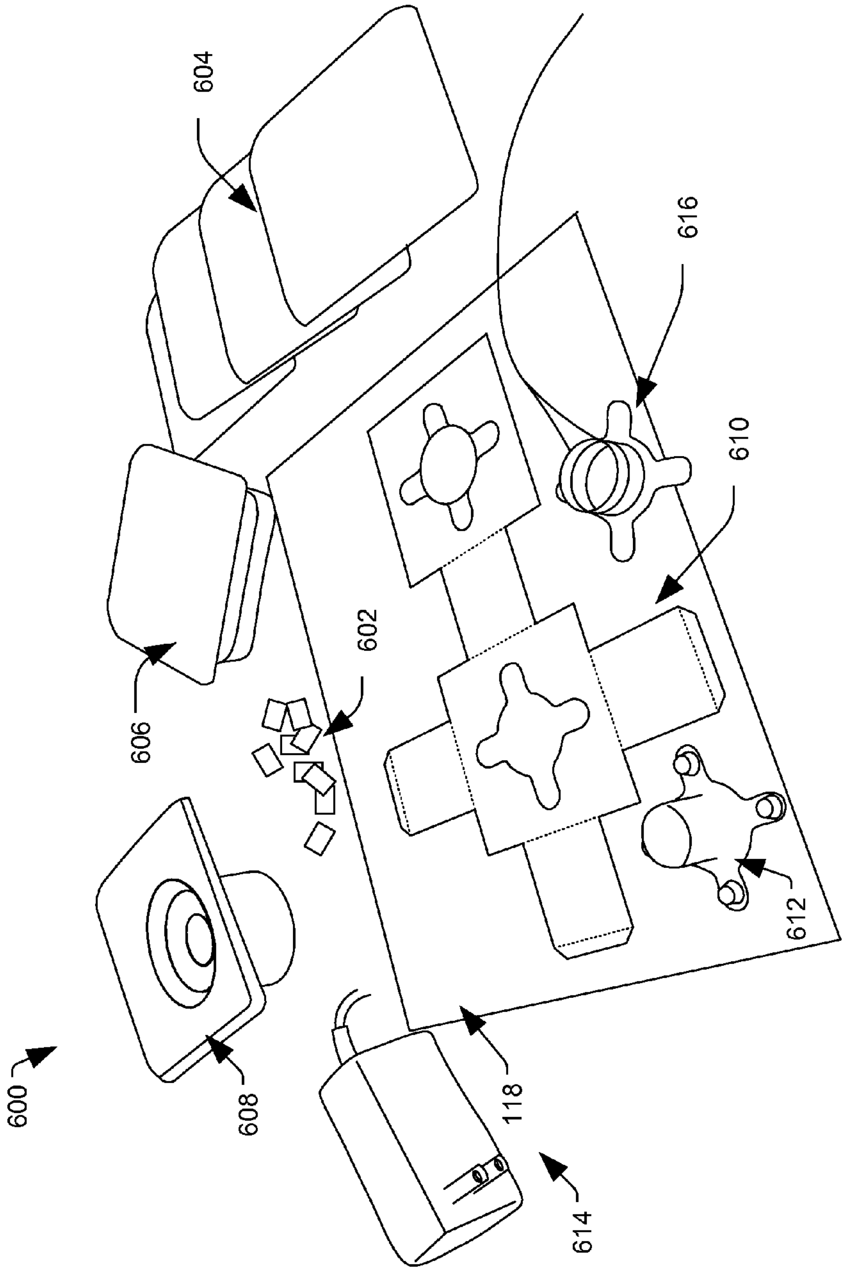
FIG. 6 is a deconstructed view of an audio kit used to assemble the cube audio system of FIG. 5.

FIG. 6 is a deconstructed view of an audio kit 600 used to assemble the cube audio system 500 of FIG. 5. The assembly 600 includes clips 602 used to snap together four panels 604 of the cube audio system. The panels 604 include grooves into which adjacent panels and the clips 602 fit to facilitate assembly. The assembly kit 600 includes a fifth panel portion 606 that includes control circuitry, as well as user input controls (e.g., buttons, switches, and a potentiometer). A diaphragm portion 608 of the assembly kit 600 is connected to the panels 604, 606 according to an instruction sheet 610. A coil assembly 612, a power cord 614, and a magnet assembly 616 are also included in the audio assembly kit 600.

Figure 7:
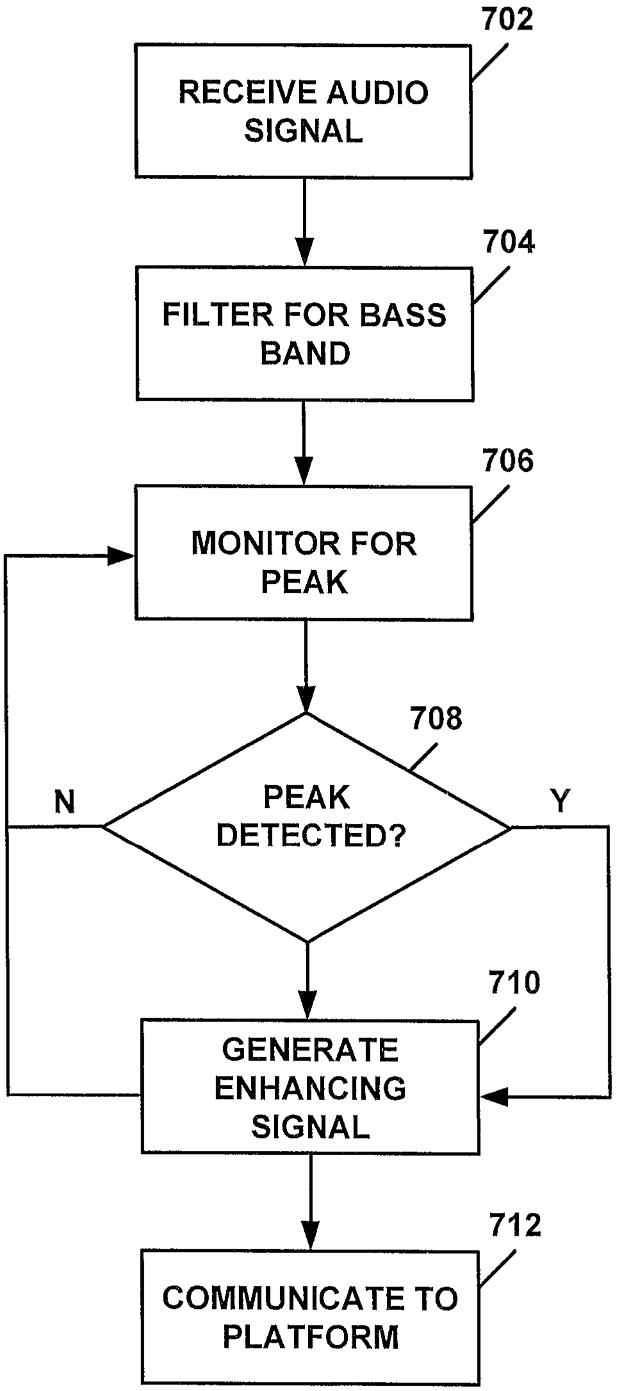
FIG. 7 is a flowchart of a method of artificially enhancing a musical beat to create an illusion of an inanimate object dancing to music.

FIG. 7 is a flowchart of a method 700 of artificially enhancing a musical beat to create an illusion of an inanimate object dancing to music. At 702 of the flowchart, an audio signal is received. For example, the audio source 210 of FIG. 2 generates and transmits the audio signal to the controller 202. A bandpass filter is used at 704 to reject frequencies of the received audio signal that fall outside of the bass band (i.e., between 20 Hz and 300 Hz). The bass band often includes percussion delimitating a musical beat. Another implementation does not include filtering processes, or filters another frequency band.

The audio signal is passed on to the controller and monitored at 706. For example, the controller of FIG. 2 monitors the magnitudes of the audio signal to detect a peak amplitude. The peak amplitude corresponds to a musical beat.

When no threshold magnitude is detected at 708, the system continues monitoring at 706. Alternatively, in response to a peak being detected at 708, the controller initiates generates an enhancing signal at 710. For example, the controller generates a short burst of non-audible sinusoids. The enhancing signal is communicated at 712 to the platform to cause the figure to more obviously bounce to the musical beat. The enhancing signal may be a sub-audible low frequency sine wave at a resonance frequency of the platform to maximize its movement. The figure is positioned on the platform and appears to dance to the beat of the music.

The system continues to monitor for a next occurring threshold magnitude at 706 after the flash operation.

Examples described herein may take the form of an entirely hardware implementation, an entirely software implementation, or an implementation containing both hardware and software elements. The disclosed methods are implemented in software that is embedded in processor readable storage medium and executed by a processor that includes but is not limited to firmware, resident software, microcode, etc.

Further, examples take the form of a computer program product accessible from a computer-usable or computer-readable storage medium providing program code for use by or in connection with a computer or any instruction execution system. For the purposes of this description, a computer-usable or computer-readable storage medium includes an apparatus that tangibly embodies a computer program and that contains, stores, communicates, propagates, or transport s the program for use by or in connection with the instruction execution system, apparatus, or device.

In various examples, the medium includes an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disc and an optical disc. Current examples of optical discs include compact disc-read only memory (CD-ROM), compact disc-read/write (CD-R/W) and digital versatile disc (DVD).

A data processing system suitable for storing and/or executing program code includes at least one processor coupled directly or indirectly to memory elements through a system bus. The memory elements include local memory employed during actual execution of the program code, bulk storage, and cache memories that may provide temporary or more permanent storage of at least some program code in order to reduce the number of times code must be retrieved from bulk storage during execution. Input/output or I/O devices (including but not limited to keyboards, displays, pointing devices, etc.) of an example are coupled to the data processing system either directly or through intervening I/O controllers. Network adapters are also coupled to the data processing system of the example to enable the data processing system to become coupled to other data processing systems or remote printers or storage devices through intervening private or public networks. Moderns, cable modems, and Ethernet cards are just a few of the currently available types of network adapters.

The previous description of the disclosed examples is provided to enable any person skilled in the art to make or use the disclosed examples. Various modifications to these examples will be readily apparent to those skilled in the art, and the generic principles defined herein may be applied to other examples without departing from the scope of the disclosure. Thus, the present disclosure is not intended to be limited to the examples shown herein, but is to be accorded the widest scope possible consistent with the principles and features as defined by the following claims.

What is claimed is:

1. A system comprising:

a receiver to receive a source audio signal;

a reciprocating surface comprising a platform; and a controller to generate a sub-audible audio signal in response to detection of a peak of the source audio signal, wherein the sub-audible audio signal produces vibrations that are communicated directly to and cause the reciprocating surface to reciprocate.

2. The system of claim 1, wherein the sub-audible audio signal comprises a low frequency sine wave.

3. The system of claim 1, wherein the sub-audible audio signal has a frequency of less than or equal to 20 hertz.

4. The system of claim 1, wherein the sub-audible audio signal has a resonance frequency.

5. The system of claim 1, further comprising-using a passband filter to select a bass band portion of the source audio signal, wherein the controller is configured to detect the peak based on the bass band portion of the source audio signal.

6. The system of claim 5, wherein the controller is further configured to monitor a magnitude of the base band portion of the source audio signal.

7. The system of claim 1, wherein the controller is configured to monitor a magnitude of the source audio signal.

8. The system of claim 1, wherein the platform receives the sub-audible audio signal and reciprocates based on the sub-audible audio signal.

9. The system of claim 1, wherein the source audio signal has a frequency of greater than 300 hertz.

10. The system of claim 1, further comprising a speaker that includes the platform, wherein the platform is configured to receive the source audio signal directly from an audio source.

11. The system of claim 1, further comprising a figure configured to rest on or attach to the platform, wherein the figure is actuated by the platform to create an impression of movement according to the sub-audible audio signal.

12. The system of claim 1, wherein the controller is further configured to detect a second peak associated with the source audio signal and to generate a second sub-audible signal in response to detection of the second peak.

13. A system comprising:

a platform to move in a reciprocal manner in response to vibrations associated with a source audio signal; and a controller to generate an enhancing signal in response to detection of a peak of the source audio signal and to provide the enhancing signal to the platform to affect movement of the platform, wherein the enhancing signal comprises a sub-audible audio signal that produces vibrations that are communicated directly to and cause the platform to move.

14. The system of claim 13, wherein the enhancing signal comprises a low frequency sine wave and includes fewer than five sinusoidal cycles.

15. The system of claim 14, wherein the enhancing signal has three sinusoidal cycles.

16. The system of claim 13, wherein the controller is configured to monitor a magnitude of the audio signal and to determine when the magnitude of the source audio signal increases above a threshold.

17. The system of claim 16, wherein the controller is configured to perform peak detection of the audio signal in response to a determination that the magnitude of the source audio signal increased above the threshold and to thereafter monitor the magnitude of the source audio signal.

18. The system of claim 13, wherein the controller is configured to use comparative logic or fuzzy logic to identify the peak.

19. A system comprising:

a platform to move in a reciprocal manner in response to vibrations communicated by a source audio signal; and a controller to detect a plurality of peaks in the source audio signal and to generate enhancing signals according to detection of the peaks, wherein the enhancing signal comprises a sub-audible audio signal that produces that vibrations that are communicated directly to and cause the platform to move in the reciprocal manner.

20. The system of claim 19, wherein, in response to each detected peak of the source audio signal, the controller is configured to generate a corresponding enhancing signal and to provide the corresponding enhancing signal to the platform, concurrently with the source audio signal provided to the platform, to increase the vibrations based on the corresponding enhancing signal.

* * * * *